United States Patent [19]

Bandy

[11] Patent Number: 5,574,736
[45] Date of Patent: Nov. 12, 1996

[54] DATA STORAGE DEVICE AND METHOD OF OPERATION

[75] Inventor: Peter B. Bandy, Pine Island, Minn.

[73] Assignee: International Business Machines Corporation, Armonk, N.Y.

[21] Appl. No.: 561,225

[22] Filed: Nov. 21, 1995

Related U.S. Application Data

[63] Continuation of Ser. No. 178,955, Jan. 7, 1994.

[51] Int. Cl.$^6$ .............................. G11C 29/00; G06F 11/00
[52] U.S. Cl. ........................ 371/40.4; 371/51.1; 395/440
[58] Field of Search .................................. 371/40.4, 10.1, 371/2.2, 11.1, 40.1, 49.1, 50.1, 51.1, 29.1, 29.5; 364/245; 395/440, 575

[56] References Cited

U.S. PATENT DOCUMENTS

| | | | |
|---|---|---|---|
| 4,870,643 | 9/1989 | Bultman et al. | 371/11.1 |
| 4,989,206 | 1/1991 | Dunphy, Jr. et al. | 371/10.1 |
| 5,317,713 | 5/1994 | Glassburn | 395/440 |
| 5,357,509 | 10/1994 | Ohizumi | 371/10.1 |
| 5,367,669 | 11/1994 | Holland et al. | 371/10.1 |
| 5,379,417 | 1/1995 | Lui et al. | 371/10.1 |
| 5,493,574 | 2/1996 | McKinley | 371/40.1 |

OTHER PUBLICATIONS

"Distributed Check–Sum Approach for Clustered Disk Drives" IBM Technical Disclosure, vol. 32 No. 6B, Nov. 1989.
The Raid Book, pp. 57–69 (1st edition) Jun. 9, 1993.

*Primary Examiner*—Roy N. Envall, Jr.
*Assistant Examiner*—Emmanuel L. Moise
*Attorney, Agent, or Firm*—Homer L. Knearl; Francis A. Sirr

[57] ABSTRACT

An improved storage device, such as a disk drive, for use in an array of drives. Each drive has logic and Exclusive Or calculation means. Data to be written is sent to the target disk drive from the host computer under a new command that instructs the target drive to generate part of the new parity, and may also identify the parity drive. The target device reads the old data from it's media, generates a parity syndrome, stores the new data and then initiates communication with the identified parity drive, instructing the parity drive to read the old parity and generate the new parity information from the parity syndrome and the old parity. The parity drive, after generating the new parity, writes the new parity onto it's media, all without further host or host I/O action.

14 Claims, 7 Drawing Sheets

FIG. I (PRIOR ART)

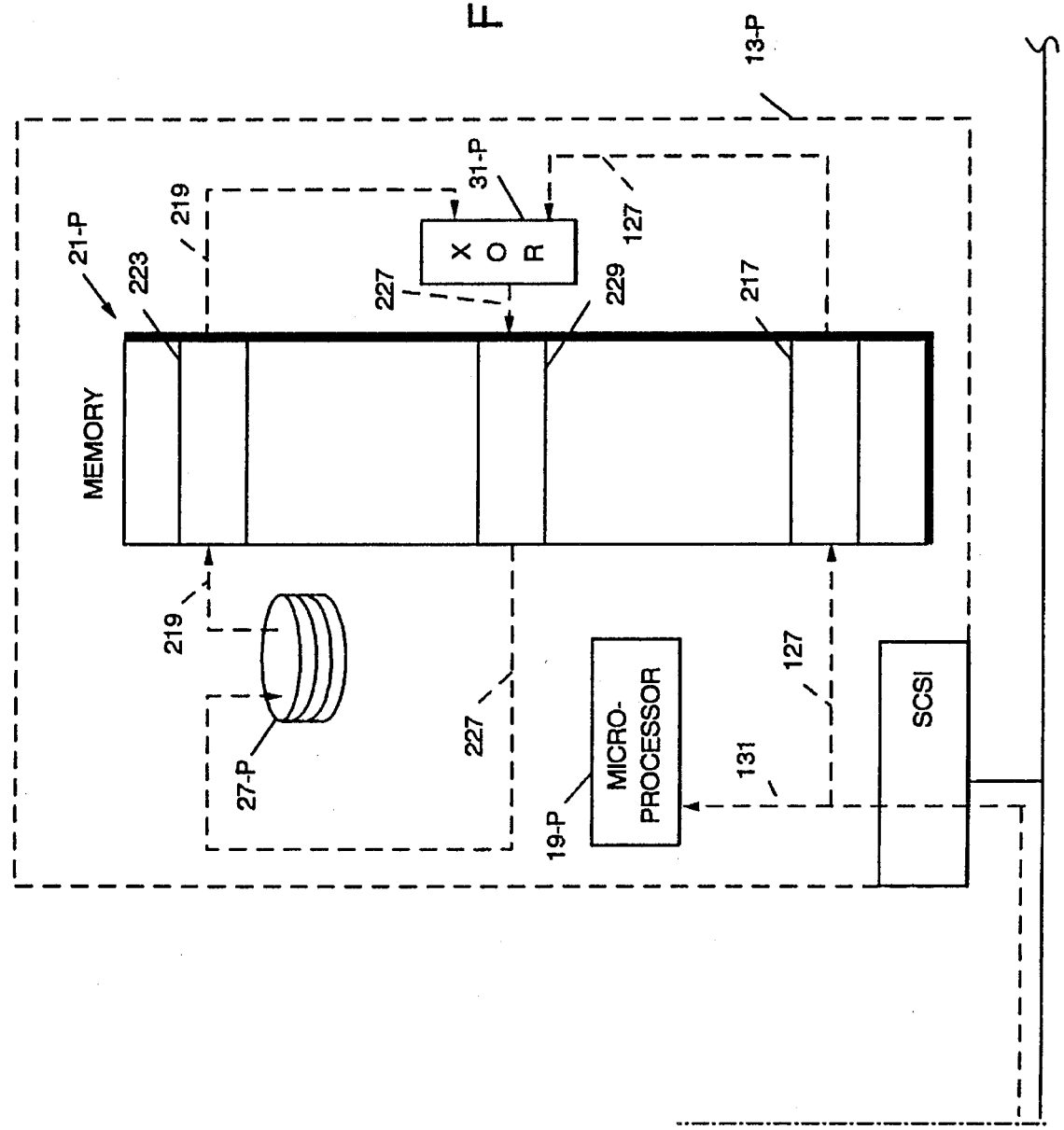

FIG. 4

| BYTE | 7 | 6 | 5 | 4 | 3 | 2 | 1 | 0 |
|---|---|---|---|---|---|---|---|---|
| 0 | | | OPERATION CODE | | | | | |
| 1 | LUN | | | DPO | FUA | RESERVED | | |
| 2 | | | | | | | | |
| 3 | LOGICAL BLOCK ADDRESS | | | | | | | |
| 4 | | | | | | | | |
| 5 | | | | | | | | |
| 6 | RESERVED | | | | | | | |
| 7 | TRANSFER LENGTH | | | | | | | |
| 8 | | | | | | | | |
| 9 | RESERVED | | | | | | | |

DATA STORAGE DEVICE AND METHOD OF OPERATION

This application is a continuation of application Ser. No. 08/178,955, filed Jan. 7, 1994.

BACKGROUND OF THE INVENTION

1. Field of the Invention

This invention relates to digital storage systems in which storage is provided by an array of storage devices.

2. Description of the Prior Art

The use of arrays of disk or other Direct Access Storage Devices (DASD) is known, and has provided large storage capacities and higher reliability at lower costs than have been achieved with single disk drives.

U.S. Pat. No. 4,870,643 teaches an array of standard five and one quarter inch disk drives mounted in a rack and panel frame using the Small Computer Storage Interface (SCSI). Data words are each divided into n segments, and each segment is transferred to one of n different drives in parallel, which speeds up the word transfer rate.

At least one disk drive stores parity check information which is used to regenerate the data on any one disk drive that may have failed. When a drive fails, an operator unplugs the failing drive from the frame, and substitutes a working drive. The regenerated data is then written on the replacement drive. The drives are operated, in synchronism, with a signal from the master controller, rather than being synchronized to one of the disks.

U.S. Pat. No. 4,989,206 teaches an array of the type described in U.S. Pat. No. 4,878,643 which includes more drives in the array than needed to store the data and parity. When a drive fails, the system replaces the failing drive with a working drive by means of reconnecting the drives through a cross point switch.

The system includes control modules having a processor and cache memory. Each control module divides the data word that it receives from the computer into the n segments to be written on n drives, and generates the parity segment to be written on the parity drive.

*IBM Technical Disclosure Bulletin*, Volume 32, Number 7, Dec. 1989, page 5, teaches an improvement in DASD array systems used with the IBM System 38 and IBM System 370.

In these systems, the checksum for corresponding DASD blocks in n drives was calculated in the CPU. In this teaching, the checksum is calculated in the I/O subsystem channel and cache in order to reduce CPU time needed to prepare the checksum record. Also, in this disclosure, data is not spread among the n drives, but is written to one of the drives. The checksum is still calculated across all of the n drives to provide error recovery for all of the drives. The checksum is not calculated from data in all of the drives each time one of the drives is written with a block of data.

Instead, the checksum is updated by Exclusive Oring the old block of data in the drive to be written to remove its effect, and then Exclusive Oring the new data to obtain the new checksum. When these Ex-Or operations are done by the CPU, it often works through it's cache memory, thereby filling the cache with long operands that are used only once. Calculations by the I/O subsystem are done directly to memory and, therefore, cache is preserved and CPU time is reduced.

*IBM Technical Disclosure Bulletin*, Volume 32, Number 6B, November 1989, page 48, teaches distributing the checksum information across each of the disk drives instead of storing it on one of the drives. This has the effect of improving reliability because the checksum must be rewritten whenever any block of data on any drive is written. If a separate checksum drive is provided, that drive operates when any of the other drives are written, and so may become backlogged with new parity blocks to be written, and also it will wear out sooner than the others.

The above-described prior art has improved the reliability of low cost disk arrays, but has also created some problems. As mentioned in the December 1989, *IBM Technical Disclosure Bulletin*, the use of the I/O subsystem is recognized as a potential source of an I/O bottleneck.

This problem is further recognized by the Redundant Array of Inexpensive Disks (RAID) Advisory Board, Inc. of LinoLakes Minn. They have published the *"RAIDBook"*, which is incorporated herein by reference, as a source of information for RAID technology. In it, they describe RAID Level 5 as a partial solution to the write parity bottleneck that may occur in RAID Level 4. RAID Level 4 is analogous to the teachings of the above December 1989 IBM publication, and RAID Level 5 is analogous to the November 1989 IBM publication. bottleneck. The bottleneck is accentuated by the fact that the host must either send write commands to all of array is controlled by Array Management Software operating in the host computer. The known alternative of providing an I/O controller is more expensive and, as described in the prior art above, may itself become a bottleneck. The bottleneck is accentuated by the fact that the host must either send write commands to all of the disks, as in RAID Levels 2 and 3, or must read the old data and the old parity in order to generate new parity for new data and then write the new data and new parity as in RAID Levels 4 and 5.

SUMMARY OF THE INVENTION

These and other problems are substantially reduced by the instant invention which provides logic and calculation means in each storage device in the array. According to the invention, data to be written is sent to the target drive from the host computer under a new command that instructs the target drive to generate part of the new parity, and may also identify the parity drive. Alternately, parity drives may be permanently assigned on the basis of the datachunks, as described in the *RAIDBook* for RAID Level 5.

The target device reads the old data from it's media, generates a parity syndrome, stores the new data and initiates communication with the identified parity drive, instructing the parity drive to read the old parity and generate new parity information from the parity syndrome and the old parity. The parity drive, after generating the new parity, writes the parity information, all without further host or host I/O action.

An advantage of the instant invention is that the cost of a separate array controller and it's power supply and packaging is eliminated while, at the same time, relieving the host computer of the parity generation and extra I/O operations that it entails. Another advantage is that the invention may be embodied, at least partially, in microcode that executes in the already existing disk device processor in each disk drive.

In another form, the addition of a minimum of Exclusive Or logic to each disk drive has the advantage of speed without adding significant load to the existing power supply in the disk drive.

BRIEF DESCRIPTION OF THE DRAWINGS

FIG. 4 sets out the format of a SCSI Write command.

DETAILED DESCRIPTION

Figure 1:
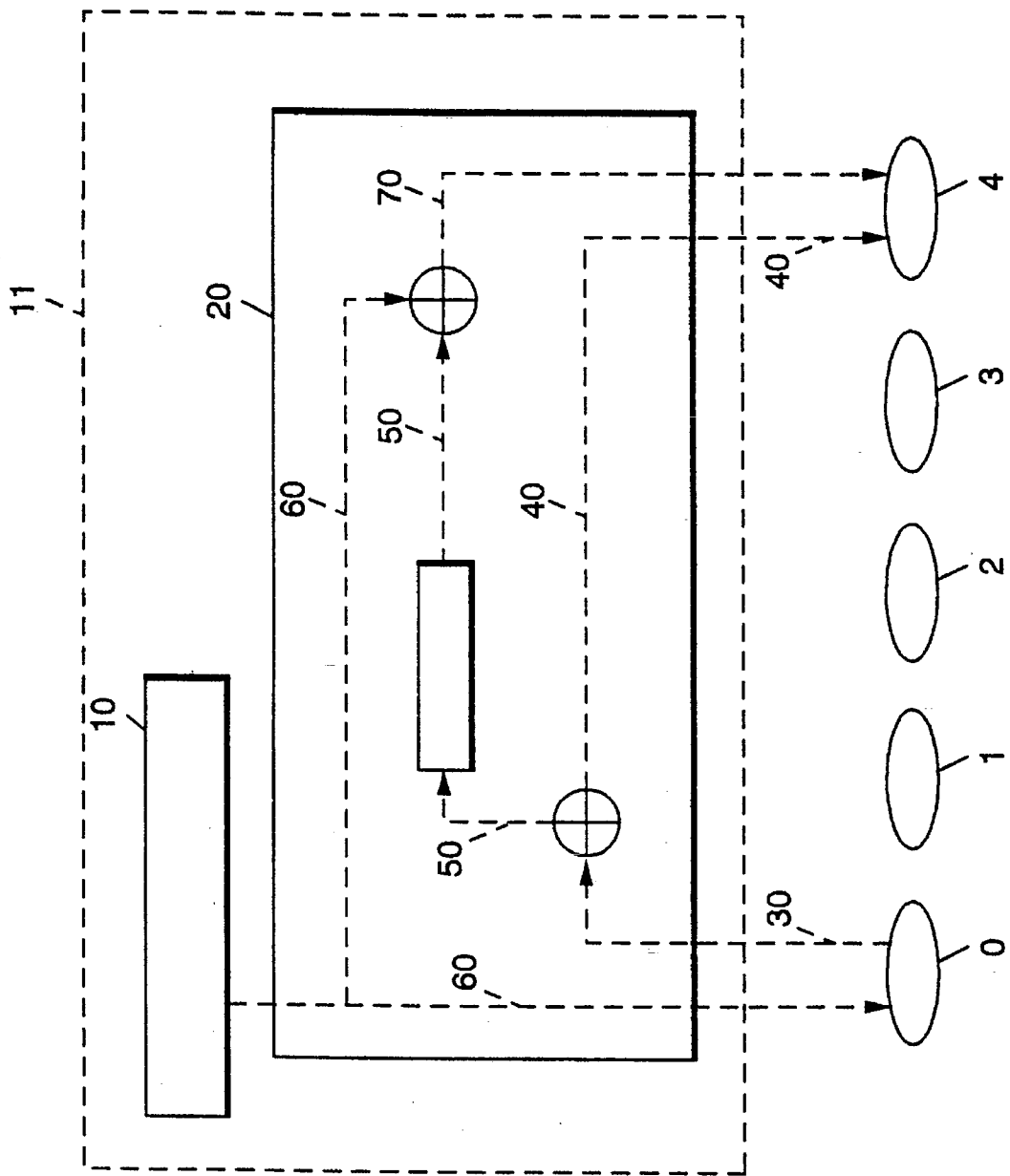
FIG. 1 is a block diagram of the data paths of the prior art method under RAID Level 5.

FIG. 1 shows typical data paths for writing data to an array disk storage system of the prior art RAID Level 5. When an application program 10, in the host computer 11, makes a write request, the parity blocks corresponding to all modified data blocks will change.

First, the Array Management Software 20 converts the application programs virtual disk address to an array member number 1 and a block address on that member. Then, the Array Management Software 20 reads the contents 30, of the member blocks to be modified, into internal buffers in the host. The Array Management Software also separately reads the contents 40, of the corresponding parity blocks, into the internal buffers from the parity drive 4 that corresponds to the selected data blocks location. The Array Management Software 20 then removes the contribution of the old data 30 in the target blocks by calculating the Exclusive Or 50 of the old data 30 and the old parity 40. Then, that intermediate result 50 is Exclusive Or'ed with the new data 60 to obtain the new parity information 70. Then, the Array Management Software writes the new parity 70 from the host to the parity drive 4, and writes the new data 60 from the host 11 to the data drive 1. Each of these read and write operations contributes to the I/O bottleneck, and consumes host computer resource.

DETAILED DESCRIPTION OF A PREFERRED EMBODIMENT

Figure 2:
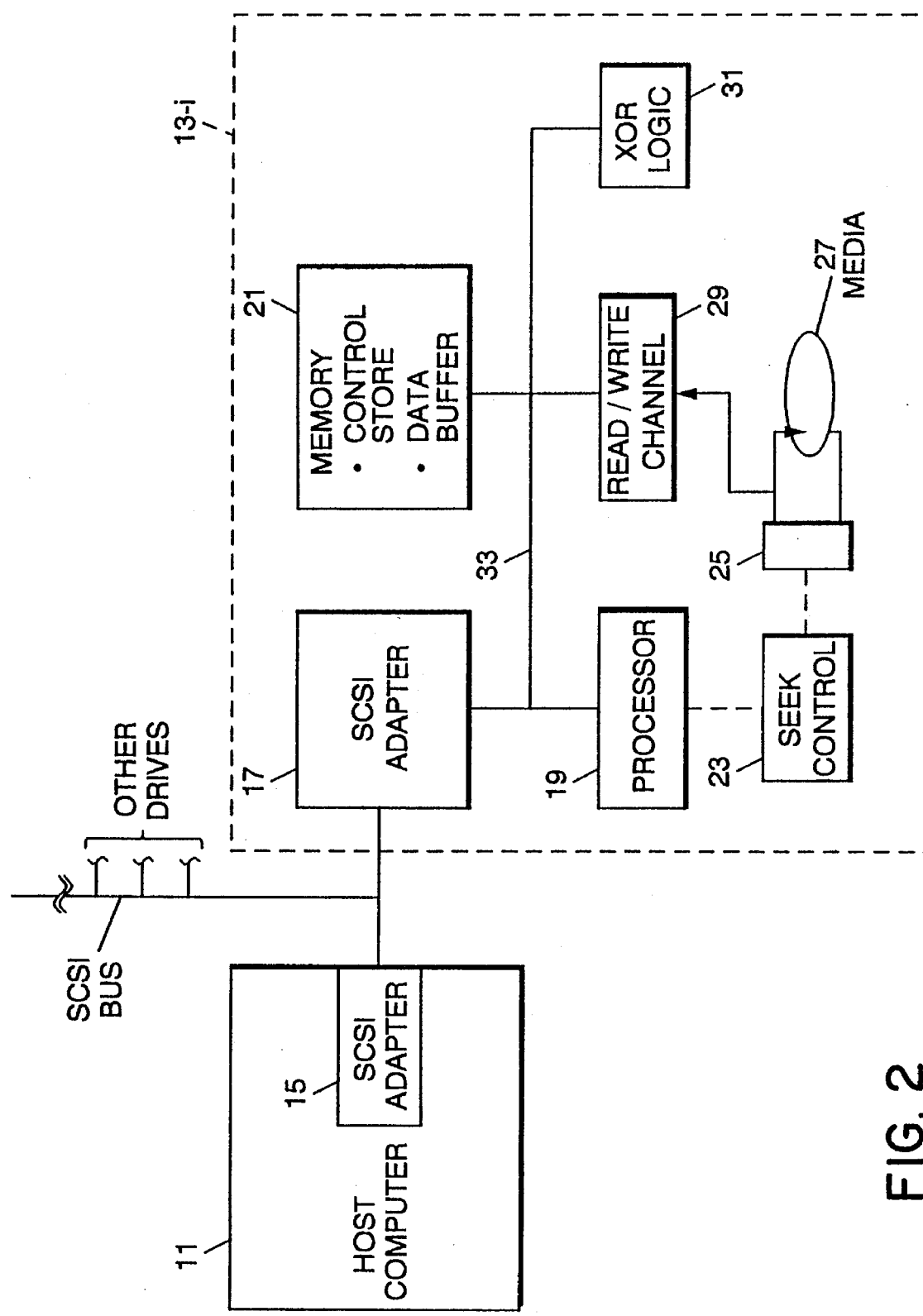
FIG. 2 is a block diagram of a data storing device in accordance with the invention.

FIG. 2 shows the block diagram of a storage device, as modified in accordance with the invention. The host computer 11 is connected to a plurality of disk devices 13-1 to 13-(n+1) by a SCSI bus adapter 15. As described in conjunction with the prior art, it is common to have an array of n+1 drives to store n drives full of data, and the associated additional drive full of parity.

Of course, as described in the RAIDBook under level 5, each drive may have mostly data and some parity in order to optimize drive performance.

The host computer 11 may be a large mainframe computer, or a smaller computer of any make or architecture, including personal computers. Each storage device 13 has a corresponding SCSI adapter 17, which is the type that can act either in receiver or in initiator mode. The SCSI architecture has the initiator mode for the purpose of allowing a DASD device to perform backup functions without passing the archive data through the host.

Each storage device 13 also has a processor 19 which is programmed to control the media hardware, and to perform the internal data transfers that are required. Processor 19 is most often a microprocessor. A memory 21 is also provided to store the programs that run in the processor 19 and to buffer the data. The data buffer function will be described in more detail in conjunction with FIGS. 3A and 3B. The processor 19 controls the media hardware through the directly connected seek control logic and drivers 23.

Drivers 23 are, in turn, connected to actuators 25 which move the magnetic read/write heads over the media 27 in this embodiment. Data which is written to, and that which is read from the media, passes through the read/write channel 29, which is connected to the read/write heads by amplifiers (not shown).

The processor 19 is connected to the SCSI adapter 17, the memory 21 and the read/write channel by a standard microprocessor bus 33 which is in the preferred embodiment, a sixteen-bit wide data and address bus of the type employed by Intel microprocessor 8096.

Figure 3A:
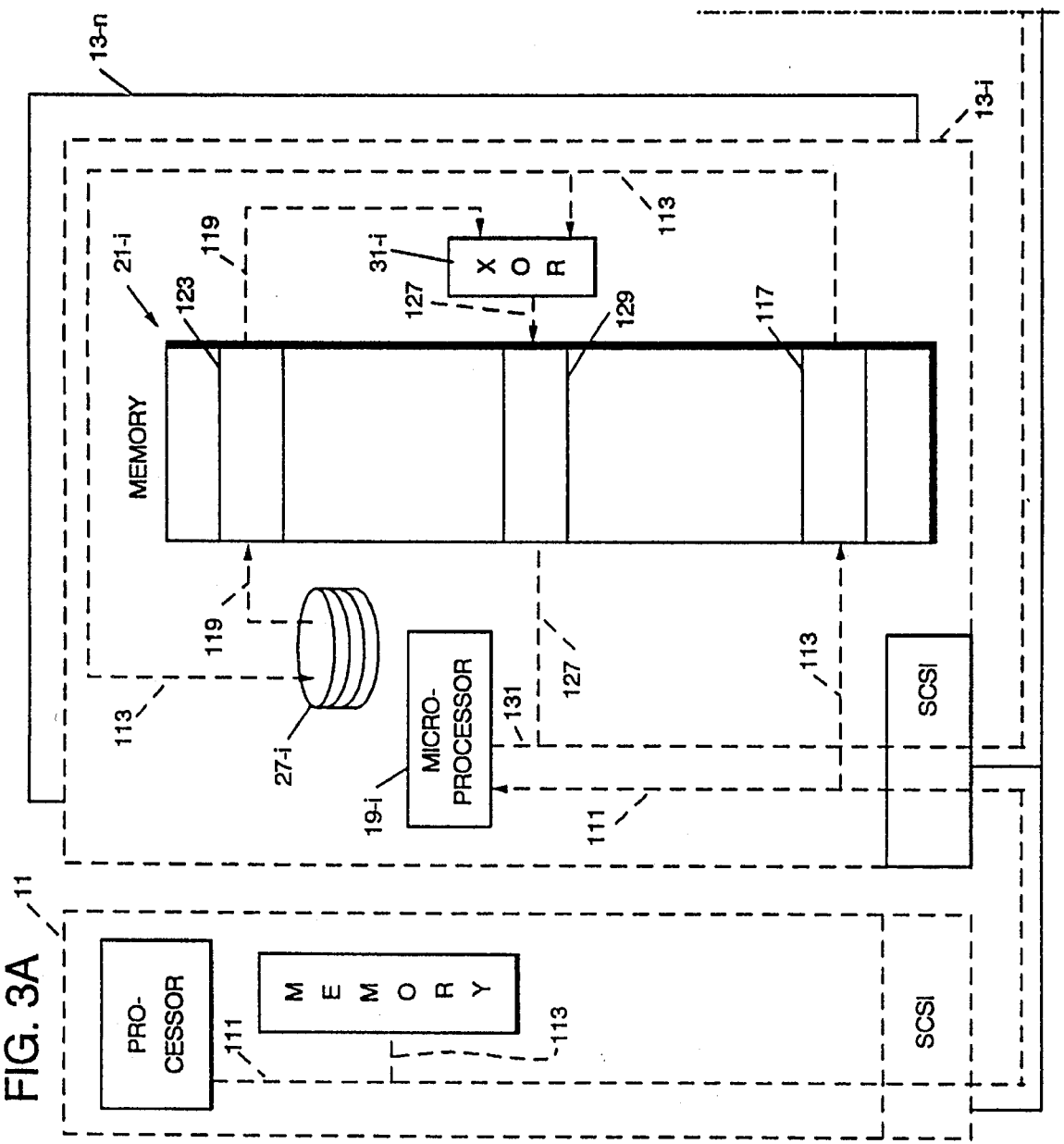
FIG. 3 consisting of FIGS. 3A and 3B is a block diagram of the data paths of the invention.

In addition to the above-described apparatus, Exclusive Or logic 31 is provided in order to generate a parity syndrome and a new parity, as will be described later in conjunction with FIGS. 3A and 3B and the new commands Write Protected and Write Parity, respectively. In this preferred embodiment, the Exclusive Or logic 31 is embodied in hardware circuitry which is connected by the bus 33 to the processor 19 and the memory 21 for operation, as depicted in FIGS. 3A and 3B. It will be recognized that the Exclusive Or logic 31 can be implemented, either completely or in part, in a program executing in the processor 19.

A programmed implementation may adversely affect the operation of the storage device, however, because a microprocessor is not usually a very fast processor, and the blocks of data that must be Exclusive Or'ed together are relatively long and will require a large amount of processing time.

The circuitry of Exclusive Or logic 31 is described in detail later, referring to FIG. 5. The command format and parameters selected for the Write Protected and the Write Parity commands will depend upon the specific implementation of the architecture that is used in the storage system.

In this embodiment, parity is established across the devices, based upon the physical block address, so that the Write Protected and Write Parity commands each have the same logical block address and transfer length. Parity mapping is chosen to be a function of the physical block addresses and is preferred to be a defined function, such as shown FIG. 6. A target storage device that receives a Write Protected command uses the function to determine which other device should receive the Write Parity command.

It will be recognized by those skilled in the art that it is also a practical embodiment to identify the parity device within the Write Protected command; for example, by using byte six of the command format shown in FIG. 4.

As described later with respect to FIG. 4, the Write Protected and Write Parity commands have the same 10 byte format as the SCSI Write 10 command, except that in the "vendor specific" bits 7 and 6 of the operation code byte are made a binary one, respectively, instead of leaving them at zero, as they are in an SCSI Write command.

OPERATION OF THE PREFERRED EMBODIMENT

Referring now to FIGS. 3A and 3B, the data paths of a preferred embodiment of the invention using SCSI architecture will be described in conjunction with its operation. First, the Array Management Software running in the host computer 11 converts the virtual disk address, that it receives from the application program, to an array member number and a block address on that member. Then the Array Management Software sends the Write Protected command 111 and the new data 113 to the selected, or target drive, 13-i in the array of n+1 drives. The Write Protected command operation ends the host computer involvement with the array, except for receipt of Command Complete from the target drive.

In the target drive 13-i, the Write Protected command 111 is acted upon by the X program in the control processor 19-i, which causes the new data 119 to be written into the data buffer at 117 in memory 21-i. Responsive to the Write Protected command 111, the X program reads the old data 119 from the affected areas of the media 27-i into the buffer at 123. Then the X program moves the old data 119 in 123, and the new data at 113 in 117, into the Exclusive Or 31-i where a parity syndrome 127 is created by the Exclusive Or of 113 and 119. The parity syndrome is temporarily stored in buffer 129.

The new data 113 is then written to the affected areas of the media 27-i. The X program then causes the SCSI adapter 17-i to enter initiate mode, and drive 13-i issues a Write Parity command 131 to the identified parity drive 13-p with the same logical block address and count as received in the Write Protected command 111 from the host 11. It also sends the parity syndrome information 127 to the parity drive 13-p.

Responsive to the Write Parity command 131, the Y program in the storage device 13-p of FIG. 3B reads the old parity 219 from the affected area of the media 27-p into the buffer at 223. Then the Y program moves the old parity 219 in 223 and the parity syndrome 127 in 217 into the Exclusive Or 31-p, where new parity information 227 is created by the Exclusive Or of 127 and 219. The new parity 227 is temporarily stored in buffer 229.

The new parity 227 is then written to the affected area of the media 27-p in place of the old parity 219. Because this new parity includes information from the old parity, it can be used to regenerate other data in corresponding blocks on other drives in the usual way in the event that one of them fails.

As can be seen from the diagram of FIGS. 3A and 3B, only two SCSI commands, and only two transfers of information, pass across the SCSI bus. All other operations are executed internal to the affected storage device drives. FIG. 4 shows the SCSI command format for the standard Write 10 command. The ten bytes, zero through 9, are depicted in the ten rows, and the eight bits of each byte are depicted in columns seven through zero, with column seven being the most significant bit.

Byte zero is the Op Code and, for the Write 10 command, it is a hexadecimal 2A or binary 00101010. Byte one contains the logical unit address, and other control fields that are not relevant to this invention. Bytes two through five is the thirty-two bit logical block address. Byte six is reserved, and bytes seven and eight are the transfer length. Byte nine is additional control fields that are not relevant to this invention.

The Write Protected and Write Parity commands have the same ten-byte format as the SCSI Write 10 command, except that in the "vendor specific" bits 7 and 6 of the operation code byte are made a binary one, respectively, instead of leaving them at zero as they are in an SCSI Write 10 command. This gives the Write Protected command an Op Code of hexadecimal AA, and the Write Parity command an OP Code of hexadecimal 6A or 10101010 and 01101010, respectively.

Figure 5:
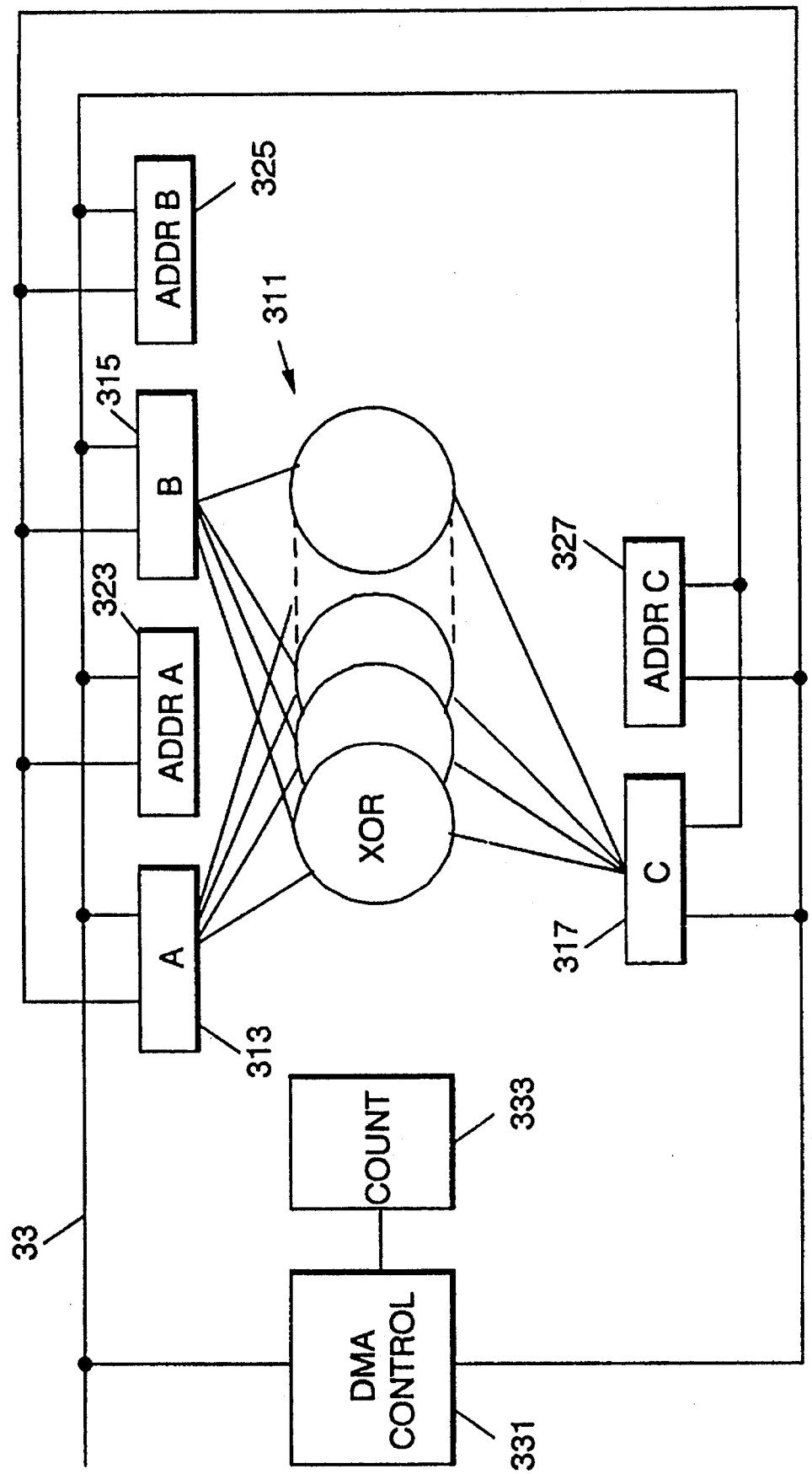
FIG. 5 is a block diagram of an implementation of the parity generating means in accordance with the invention.

FIG. 5 is a block diagram showing one embodiment of the Exclusive Or logic 31 in more detail. The heart of logic 31 is a plurality of Exclusive Or circuits 311 connected, as a parallel array, between three registers. The number of Exclusive Or circuits is advantageously chosen to be the same as the width of the data path of bus 33 shown in FIG. 2.

Likewise, registers 313, 315 and 317 are the same width as bus 33. Associated with each register is an address register 323, 325 and 327, respectively. Each address register stores the starting address of the buffer in memory 21 where an operand is stored, or the result will be stored. For example, register 323 points to the starting address of buffer 117 which contains the new data, as shown in FIG. 3. Likewise, register 325 stores the start address of buffer 123 where the old data is contained, and register 327 stores the address where the parity syndrome will be stored.

Logic 31 includes a control block 331 which is connected to a counter 333. Together they control the operation of Exclusive Or logic 31 in Direct Memory Access (DMA) mode. A subprogram of the programs X and Y operate in microprocessor 19 to initialize the DMA operation by commanding control block 331 to load a following length count into register 333 that indicates the number of bytes of new data to be written. Thereafter, the start addresses are loaded into the registers 323, 325 and 327 under control of block 331.

When the microprocessor 19 sends a start command to control 331, it begins loading the registers 313 and 315 from the identified addresses, Exclusive Or'ing them, and storing the result from register 317 back into memory 19 at the address pointed to by register 327. Control block 331 then steps the counter 333 and the content of the address registers 323, 325 and 327, and repeats the cycle until the count in counter 333 has been reduced to zero. At that point, the old data and the new data, for example, will have been completely Exclusive Or'ed in drive 13-i, and the operation of generating the parity syndrome is complete.

The same sequence will be performed in the parity drive 13-p to generate new parity from the parity syndrome and the old parity.

Figure 6:
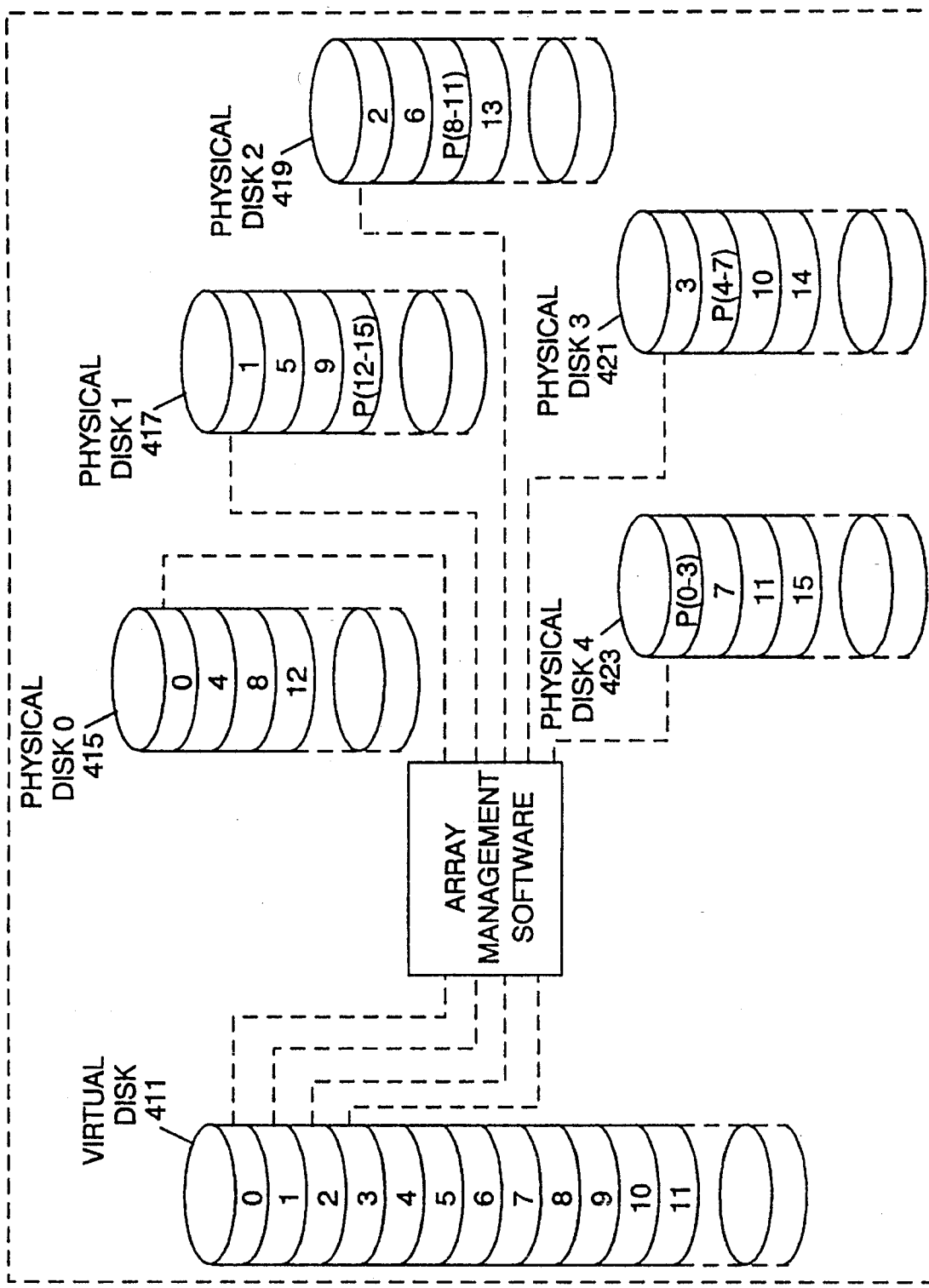
FIG. 6 is a diagram of a possible function for choosing a parity device.

FIG. 6 is a diagram of an example mapping of data distribution across member storage devices according to RAID Level 5. A virtual disk 411 has blocks 0 through 11, etc. It is connected to an array of physical storage devices, zero through four, by Array Management Software 413. Device 415 (labeled Disk zero) stores blocks 0, 4, 8, and 12. Device 417 (labeled Disk one) stores blocks 1, 5,9, and parity for blocks 12, 13, 14, and 15. Device 419 (labeled Disk two) stores blocks 2, 6, 13 and parity for blocks 8, 9, 10, and 11 Device 421 (labeled Disk three) stores blocks 3, 10, 14, and parity for blocks 4, 5, 6, and 7. Device 423 (labeled Disk four) stores blocks 7, 11, 15, and parity for blocks 0, 1, 2, and 3.

Having described the invention in terms of a preferred embodiment thereof, it will be recognized by those skilled in the art of computer peripheral equipment design that various changes in the structure and programming of the implementations described can be made without departing from the spirit and scope of the invention which is measured by the following claims.

I claim:

1. A storage device of a type used in conjunction with a host computer and at least one other storage device that is of a generally similar type, said storage device comprising:

an interface for connecting said storage device to said host computer and to said at least one other storage device;

control means connected to said interface for receiving a first command and new data from said host computer;

storage media for storing old data;

memory means controlled by said control means in response to said first command for storing said new data;

calculation means connected to said memory means and said storage media for calculating a result from said new data and said old data, said result being useful as error correction information; and means including said interface for issuing a second command and said calculation result to said at least one other storage device.

2. The storage device of claim 1 wherein said storage media comprises disk media.

3. The storage device of claim 1 wherein said control means comprises a microprocessor.

4. The storage device of claim 1 wherein said interface comprises a Small Computer Storage Interface (SCSI) interface.

5. The storage device of claim 1 wherein said calculation means comprises:

exclusive or logic.

6. The storage device of claim 1 wherein said first command is a Write Protected command for causing said control means to store on said storage media said new data received from said host computer.

7. The storage device of claim 6 wherein said Write Protected command complies with the requirements for SCSI commands.

8. The storage device of claim 7 wherein said Write Protected command has an op code bit pattern of 10101010.

9. The storage device of claim 1 wherein said second command is a Write Parity command for causing said at least one other storage device to store said calculation result.

10. The storage device of claim 9 wherein said Write Parity command complies with the requirements for SCSI commands.

11. The storage device of claim 10 wherein said Write Parity command has an op code bit pattern of 01101010.

12. The storage device of claim 1 wherein said calculation result is error correction information from which the effect of said old data has been removed and the effect of said new data had been added.

13. A storage system used in conjunction with a host computer, said storage system having at least a target storage device and a parity storage device, the system comprising:

a first interface in said target storage device connecting said target storage device to said host computer and to said parity storage device, and for receiving a first command and new data from said host computer;

first storage media in said target storage device for storing old data;

first memory means in said target storage device connected to said first interface and controlled by said first command for storing said new data;

first exclusive-or calculation means in said target storage device connected to said first memory means and said first storage media for calculating a new error correction information from said new data and said old data;

said new error correction information having the effect of said old data removed therefrom and the effect of said new data added thereto;

means including said first interface for issuing a second command and said new error correction information to said parity storage device;

a second interface in said parity storage device for receiving said second command and said new error correction information;

second memory means in said parity storage device connected to said second interface and controlled by said second command for storing said new error correction information;

second storage media in said parity storage device for storing old parity information;

second exclusive-or calculating means in said parity storage device connected to said second memory means and said second storage media for calculating new parity information from said new error correction information and said old parity information; and means in said parity storage device for storing said new parity information on said second storage media.

14. The method of storing data in a system having a computer and an array of storage devices comprising the steps of:

sending a first command and new data from said computer to a first storage device;

reading old data from first media in said first storage device;

calculating the Exclusive Or of said new data and said old data in said first storage device to create first error correcting information which includes information concerning removal of the effect of said old data, and which also includes information concerning the effect of said new data;

storing said new data on said first media;

sending a second command and said first error correcting information from said first storage device to a second storage device;

reading old error correction information from second media in said second storage device;

calculating the Exclusive Or of said first error correcting information and said old error correcting information to create new error correcting information which includes information concerning removal of the effect of said old data, also includes information concerning the effect of said new data, and also includes the effect of other data stored on other storage devices of said array; and storing said new error correcting information on said second media.

* * * * *